(12) United States Patent
Ishii et al.

(10) Patent No.: US 11,448,256 B2
(45) Date of Patent: Sep. 20, 2022

(54) SLIDE BEARING AND METHOD FOR MANUFACTURING SAME

(71) Applicant: OILES CORPORATION, Tokyo (JP)

(72) Inventors: Yuta Ishii, Fujisawa (JP); Kouichi Morishige, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 96 days.

(21) Appl. No.: 16/982,400

(22) PCT Filed: Mar. 7, 2019

(86) PCT No.: PCT/JP2019/009196
§ 371 (c)(1),
(2) Date: Sep. 18, 2020

(87) PCT Pub. No.: WO2019/181546
PCT Pub. Date: Sep. 26, 2019

(65) Prior Publication Data
US 2021/0071714 A1    Mar. 11, 2021

(30) Foreign Application Priority Data

Mar. 22, 2018 (JP) .............................. JP2018-054778

(51) Int. Cl.
*F16C 17/04* (2006.01)
*F16C 33/20* (2006.01)
(Continued)

(52) U.S. Cl.
CPC .............. *F16C 17/04* (2013.01); *F16C 33/20* (2013.01); *F16C 33/208* (2013.01); *F16C 33/74* (2013.01); *F16J 15/3204* (2013.01)

(58) Field of Classification Search
CPC .......... F16C 17/04; F16C 33/08; F16C 33/20; F16C 33/208; F16C 33/74
See application file for complete search history.

(56) References Cited

U.S. PATENT DOCUMENTS 8,882,357 B2   11/2014   Morishige et al.
9,381,784 B2 *  7/2016   Stautner ............... B60G 15/068
(Continued)

FOREIGN PATENT DOCUMENTS

CN       1598273 A    3/2005
CN       101438069 A  5/2009
(Continued)

OTHER PUBLICATIONS

Extended European Search Report dated Nov. 5, 2021 issued in European Application No. 19771360.5 (8 pages).
(Continued)

*Primary Examiner* — James Pilkington
(74) *Attorney, Agent, or Firm* — Nixon & Vanderhye P.C.

(57) ABSTRACT

A slide bearing is made of synthetic resin and has an upper case, a lower case combined with the upper case, and an annular center plate placed between the upper case and the lower case so as to allow relative rotation between the upper case and the lower case. The center plate is integrally formed with the lower case. A joining surface of the lower case that joins to the center plate has a grip part, and the joining surface of the center plate has a grasp on the grip part.

11 Claims, 17 Drawing Sheets

(51) Int. Cl.
*F16C 33/74* (2006.01)
*F16J 15/3204* (2016.01)

(56) References Cited

U.S. PATENT DOCUMENTS

| | | | |
|---|---|---|---|
| 9,556,906 B2* | 1/2017 | Sakairi | F16C 17/18 |
| 10,421,329 B2* | 9/2019 | Takahashi | B60G 15/068 |
| 11,181,147 B2* | 11/2021 | Ishii | F16C 33/20 |
| 2005/0062008 A1 | 3/2005 | Makino et al. | |
| 2009/0220179 A1* | 9/2009 | Kaneko | F16C 33/74 |
| | | | 384/420 |
| 2013/0322798 A1* | 12/2013 | Morishige | F16C 32/0419 |
| | | | 384/420 |
| 2015/0367698 A1 | 12/2015 | Stautner et al. | |

FOREIGN PATENT DOCUMENTS

| | | |
|---|---|---|
| CN | 101449068 A | 6/2009 |
| CN | 103026083 A | 4/2013 |
| CN | 104936806 A | 9/2015 |
| EP | 2 574 481 | 4/2013 |
| JP | 53-004134 | 1/1978 |
| JP | 2-66718 | 5/1990 |
| JP | 2005-090419 | 4/2005 |
| JP | 2007-303643 | 11/2007 |
| JP | 2017-44226 | 3/2017 |
| WO | WO2017122646 * | 7/2017 |

OTHER PUBLICATIONS

International Search Report for PCT/JP2019/009196, dated May 28, 2019, 5 pages.
Written Opinion of the ISA for PCT/JP2019/009196, dated May 28, 2019, 5 pages.
Chinese Search Report dated Jan. 4, 2022 in Chinese Application No. 201980019873.8 with English translation (5 pages).

* cited by examiner

Fig. 10
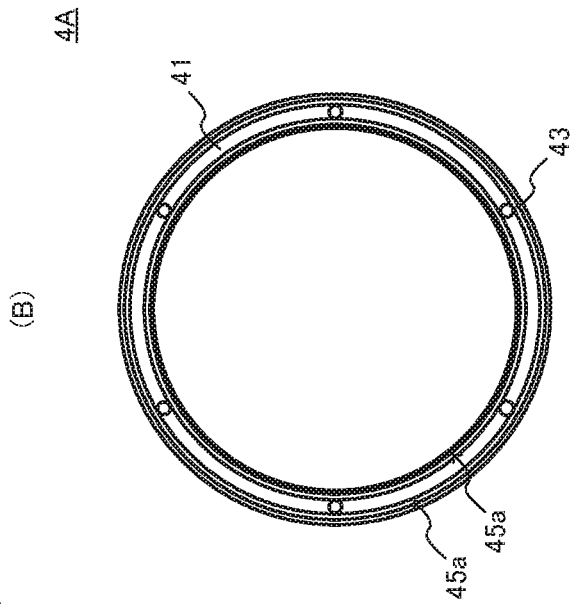
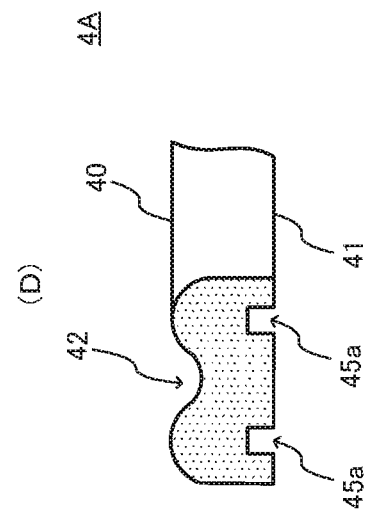
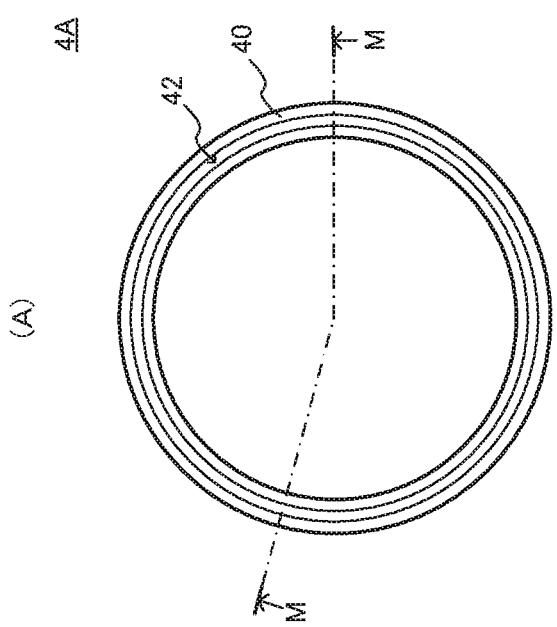
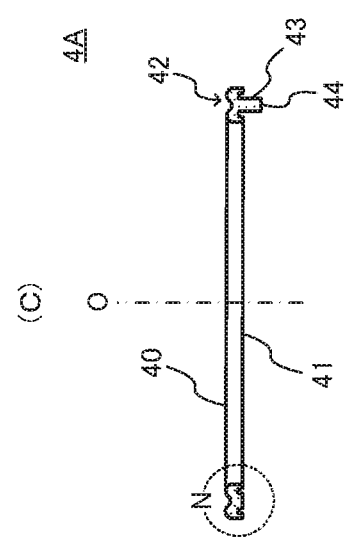

Fig. 14
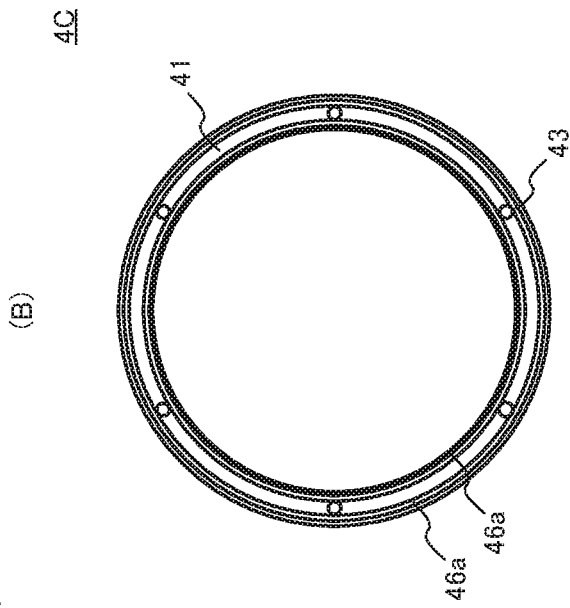
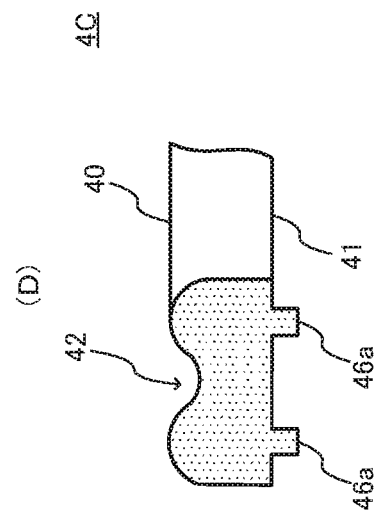
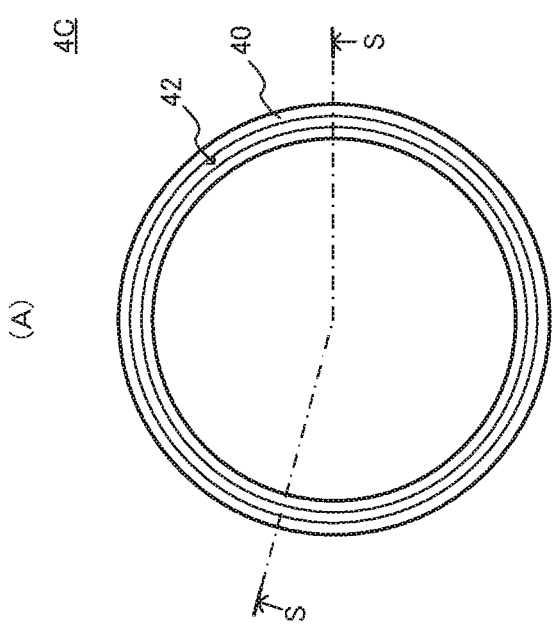
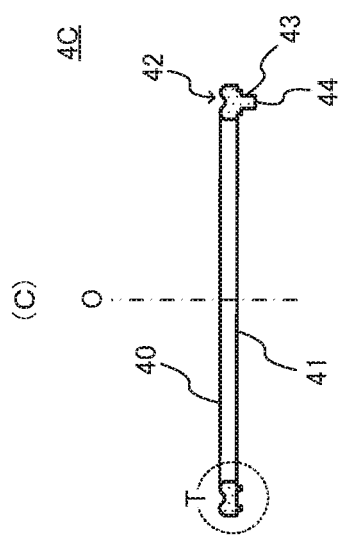

SLIDE BEARING AND METHOD FOR MANUFACTURING SAME

CROSS-REFERENCE TO RELATED APPLICATION

This application is the U.S. national phase of International Application No. PCT/JP2019/009196 filed 7 Mar. 2019, which designated the U.S. and claims priority to JP Patent Application No. 2018-054778 filed 22 Mar. 2018, the entire contents of each of which are hereby incorporated by reference.

TECHNICAL FIELD

The present invention relates to a slide bearing for supporting a load, and in particular relates to a slide bearing made of synthetic resin and available to support a load on a shaft member, such as a suspension of a vehicle.

BACKGROUND ART

A strut type suspension (McPherson strut), which is to be used for front wheels of an automobile, has a shock absorber and a coil spring arranged so as to surround the shock absorber, and allows the coil spring to rotate relative to an upper mount for mounting the strut type suspension on a vehicle body in response to steering operation. Accordingly, in order to support a load applied on the strut type suspension while allowing such relative rotation to be smooth, a bearing is usually installed between the upper mount and an upper spring seat that is provided as a spring seat for supporting an upper end of the coil spring.

For example, Patent Literature 1 discloses a synthetic resin slide bearing for a strut type suspension. This slide bearing has an upper case to be attached to an upper mount, a lower case rotatably combined with the upper case so as to be attached to an upper spring seat, and a center plate placed in an annular space formed by combination of the upper case and the lower case and thereby enabling rotation between the upper case and the lower case.

CITATION LIST

Patent Literature

Patent Literature 1: Japanese Unexamined Patent Application Laid-Open No. 2017-44226

SUMMARY OF INVENTION

Technical Problem

The synthetic resin slide bearing disclosed by Patent Literature 1 is, however, such that the upper case, the lower case, and the center plate are separate component parts; therefore being assembled by combination of these parts formed separately. This causes an increased number of component parts, resulting in an increased cost for assembly, and occasionally leads to some rejected products resulting from missing of some of the parts, especially the center plate. In addition, parts management also is costly depending on the number of component parts.

The present invention has been made in view of the above situation, and an object of the invention is to provide a slide bearing and manufacturing method of the same, which allow for reduction in the number of component parts and yield enhancement, resulting in cost reduction.

Solution to Problem

In response to the above issue, according to the present invention, for a slide bearing made of synthetic resin, a center plate is integrally formed with a case that is either a lower case or an upper case, and a joining surface of the case (the lower case or the upper case) to the center plate has a grip part grasped by a joining surface of the center plate to the case (the lower case or the upper case).

For example, the present invention provides a slide bearing for supporting a load; the slide bearing is made of synthetic resin and has the following:

an upper case;

a lower case combined with the upper case; and a center plate in an annular shape, which is placed between the upper case and the lower case and allows relative rotation between the upper case and the lower case.

The center plate is integrally formed with a case which is either the lower case or the upper case, and a joining surface of the case (the lower case or the upper case) to the center plate has a grip part grasped by a joining surface of the center plate to the case (the lower case or the upper case).

Advantageous Effects of Invention

According to the present invention, for the slide bearing made of synthetic resin, the center plate is integrally formed with the case (which is either the lower case or the upper case), which results in decreased number of component parts; and the joining surface of the case the lower case or the upper case) to the center plate has the grip part grasped by the joining surface of the center plate to the case (the lower case or the upper case). Here, during two-color injection molding process where the center plate is to be completed in the secondary cavity, the center plate shrinks due to cooling after the secondary molding, but the molded item (the lower case or the upper case) completed in the primary cavity, with which the center plate is to be integral during the secondary molding, has been already shrunk due to cooling after the primary molding thereby being stable in dimensions. Accordingly, the shrinkage of the center plate after the secondary molding causes the joining surface of the center plate to the molded item in the primary cavity to grasp tightly the grip part of the molded item in the primary cavity. Furthermore, this grip part results in increase in jointing area between the center plate and the molded item in the primary cavity. This enhances bonding strength between the center plate and the molded item in the primary cavity, which prevents the center plate from separating from the molded item in the primary cavity, thereby causing the resultant yield enhancement. Consequently, according to the present invention, it is possible to reduce the number of component parts and to reduce costs because of the yield enhancement.

BRIEF DESCRIPTION OF DRAWINGS

FIG. 10(A) and FIG. 10(B) are respectively a plan view and a bottom view of a center plate 4A according to a modification of the center plate 4, FIG. 10(C) is an M-M cross sectional view of the center plate 4A as illustrated in FIG. 10(A), and FIG. 10(D) is an enlarged view of the part N of the center plate 4A as illustrated in FIG. 10(C).

FIG. 14(A) and FIG. 14(B) are respectively a plan view and a bottom view of a center plate 4C according to a modification of the center plate 4, FIG. 14(C) is an S-S cross sectional view of the center plate 4C as illustrated in FIG. 14(A), and FIG. 14(D) is an enlarged view of the part T of the center plate 4C as illustrated in FIG. 14(C).

DESCRIPTION OF EMBODIMENTS

In the following, one embodiment of the present invention will be described.

Figure 1:
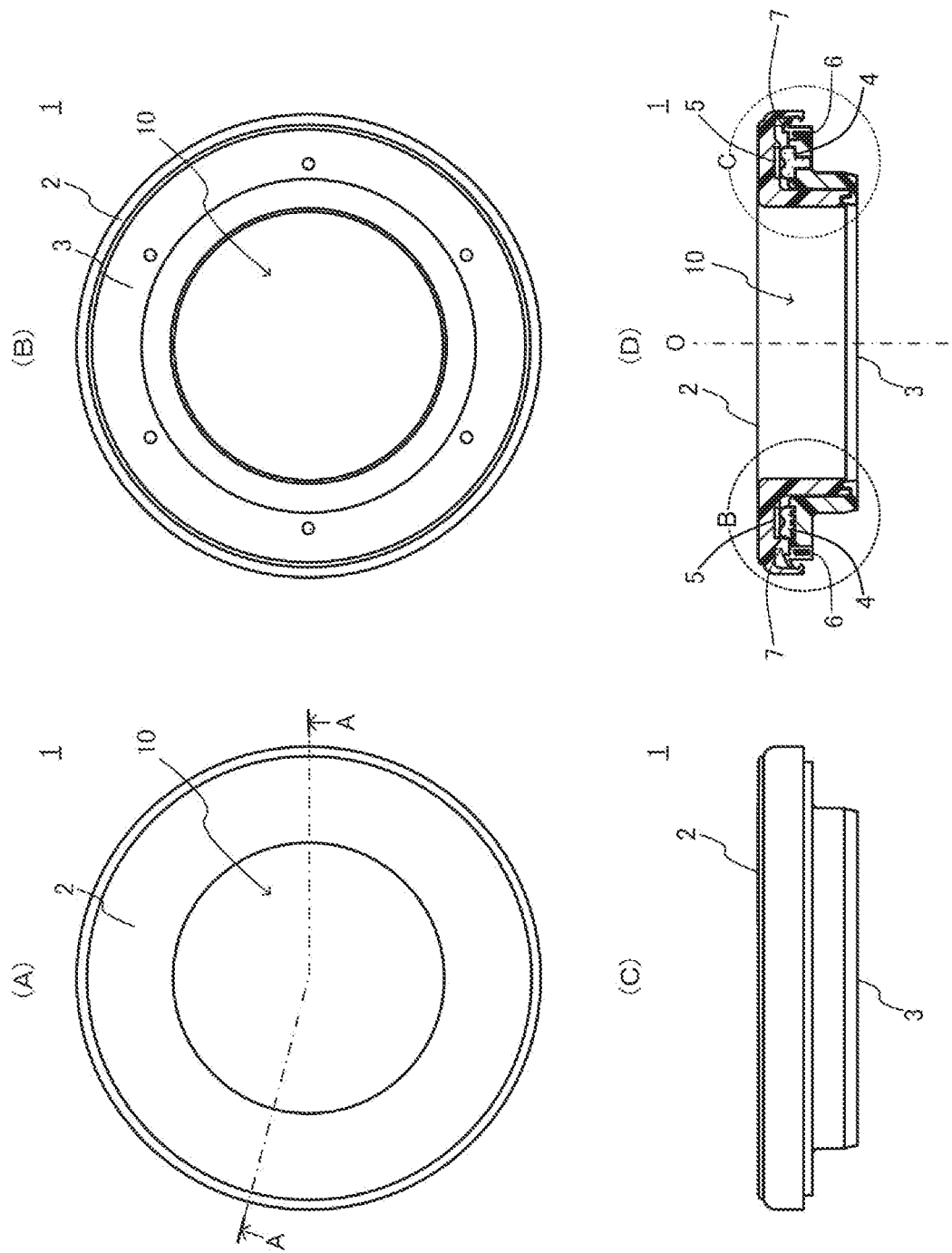
FIG. 1(A), FIG. 1(B), and FIG. 1(C) are respectively a plan view, a bottom view, and a front view, of a slide bearing 1 according to one embodiment of the present invention.
FIG. 1(D) is an A-A cross sectional view of the slide bearing 1 as illustrated in FIG. 1(A).

FIG. 1(A), FIG. 1(B), and FIG. 1(C) are respectively a plan view, a bottom view, and a front view, of a slide bearing 1 according to the present embodiment, and FIG. 1(D) is an A-A cross sectional view of the slide bearing 1 as illustrated in FIG. 1(A). FIG. 2(A) is an enlarged view of the part B of the slide bearing 1 as illustrated in FIG. 1(D), and FIG. 2(B) is an enlarged view of the part C of the slide bearing 1 as illustrated in FIG. 1(D).

The slide bearing 1 according to the present embodiment, which is made of synthetic resin, includes a holding hole 10 for holding a shock absorber (not illustrated in the figures) of a suspension for vehicle (for example, a strut type suspension) within and is capable of supporting a load of a vehicle body to be applied on the suspension while allowing rotation of a coil spring surrounding the shock absorber held within this holding hole 10.

As illustrated in the figures, the slide bearing 1 has the following: an upper case 2; a lower case 3 that is rotatably combined with the upper case 2 thereby forming an annular space 7 between the lower case 3 and the upper case 2; a center plate 4 in substantially annular shape and a sliding sheet 5 in substantially annular shape, each being placed in the annular space 7; a dust seal 6 in substantially annular shape that seals the annular space 7 so as to prevent ingress of foreign substances, such as dust, into the annular space 7; and lubricant, such as lubricating grease, filled in the annular space 7 although not illustrated. Here, the center plate 4 and the dust seal 6 are integrally formed with the lower case 3.

The upper case 2 is made of synthetic resin, such as polyacetal resin, polyamide resin, and polybutylene terephthalate resin, which is impregnated with lubricating oil as necessary thereby resulting in enhanced sliding properties. The upper case 2 is to be attached to an upper mount (not illustrated in the figures) provided as a mounting mechanism for mounting the suspension onto the vehicle body, with the shock absorber of the suspension inserted therein.

Figure 3:
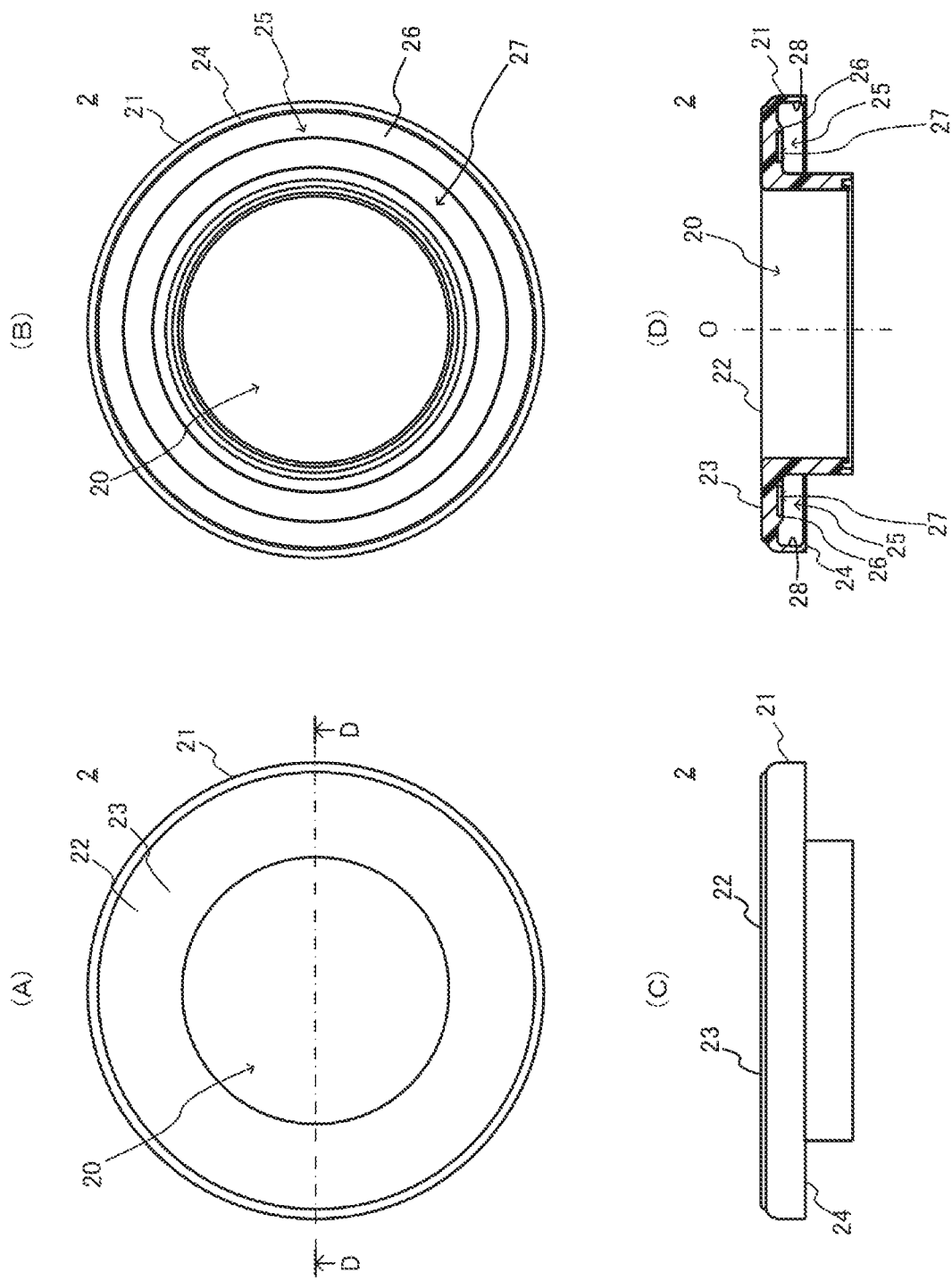
FIG. 3(A), FIG. 3(B), and FIG. 3(C) are respectively a plan view, a bottom view and a front view, of an upper case 2.
FIG. 3(D) is a D-D cross sectional view of the upper case 2 as illustrated in FIG. 3(A).

FIG. 3(A), FIG. 3(B), and FIG. 3(C) are respectively a plan view, a bottom view and a front view, of the upper case 2, and FIG. 3(D) is a D-D cross sectional view of the upper case 2 as illustrated in FIG. 3(A).

As illustrated in the figures, the upper case 2 has the following: an upper case body 21 in annular shape including an insertion hole 20 for insertion of the shock absorber; an attachment surface 23 formed in an upper surface 22 of the upper case body 21 and available for mount of the slide bearing 1 onto the upper mount; an annular recess 25 formed in a lower surface 24 (that faces the lower case 3) of the upper case body 21 and forming the annular space 7 while rotatable combination of the upper case 2 and the lower case 3; and an annular groove 27 formed in a bottom surface 26 inside the annular recess 25 and available for attachment of the sliding sheet 5.

The lower case 3 is made of synthetic resin, such as polyacetal resin, polyamide resin, and polybutylene terephthalate resin; and is to be attached to an upper spring seat (not illustrated in the figures) for supporting an upper end of the coil spring (not illustrated in the figures) of the suspension, with the shock absorber of the suspension inserted therein.

FIG. 4(A), FIG. 4(B), and FIG. 4(C) are respectively a plan view, a bottom view, and a front view, of the lower case 3, and FIG. 4(D) is an E-E cross sectional view of the lower case 3 as illustrated in FIG. 4(A).

As illustrated in the figures, the lower case 3 has a lower case body 31 in substantially cylindrical shape including an insertion hole 30 for insertion of the shock absorber and a flange 33 formed on an upper end 32 side of the lower case body 31 facing the upper case 2 so as to project radially outward from an outer peripheral surface 38 of the lower case body 31; the flange 33 is inserted into the annular recess 25 formed in the lower surface 24 of the upper case body 21 of the upper case 2 when rotatable combination of the lower case 3 and the upper case 2, thereby forming the annular space 7.

The upper spring seat is to be attached to a lower surface 330 of the flange 33.

Figure 17:
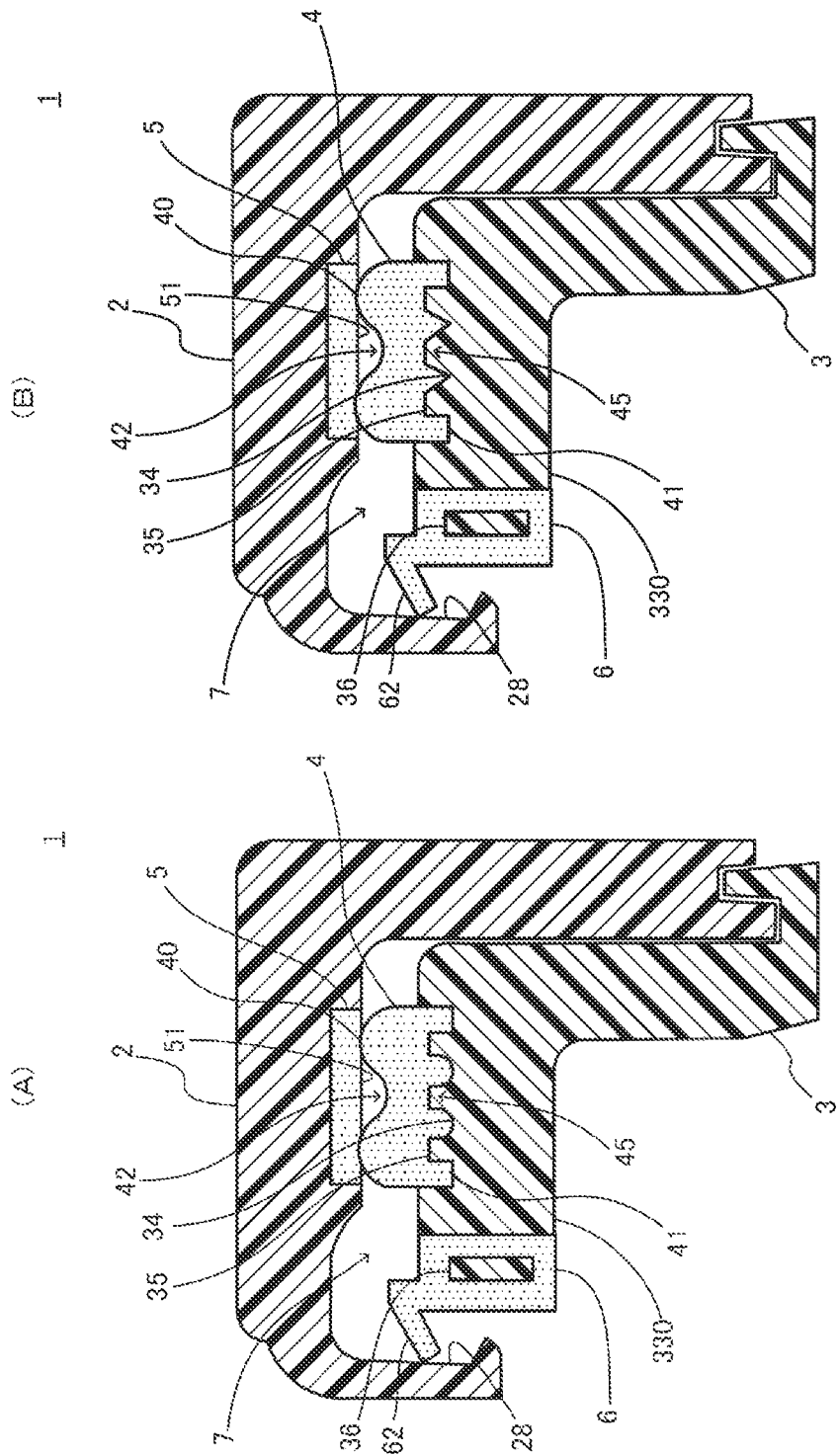
FIG. 17(A) and FIG. 17(B) are respectively an enlarged view of the modified slide bearing 1 and correspond to FIG. 2(A).

A joining surface 34 is annularly formed in an upper surface 331 of the flange 33 so as to be joined to the center plate 4 integrated with the lower case 3. Moreover, grip parts 35 each having a cylindrical convex shape are formed on the joining surface 34 so as to be arranged in such a pattern that plural grip parts are placed for each line in radial and circumferential directions of the center plate 4, and each grip part 35 is to be grasped by the center plate 4 joined to this joining surface 34 (See FIG. 2(A)). Each of the grip parts 35 has, but not limited to, a cylindrical convex shape: it may have a prismatic convex shape, including triangular prism or square prism. Alternatively, each of the grip parts 35 may have a hemispherical shape as shown in FIG. 17(A), or may have a pyramidal shape as shown in FIG. 17(B), including triangular pyramid. The grip parts 35 may be formed so as to be arranged in such a pattern that at least one grip part 35 is placed on each line in the radial direction and plural grip parts 35 are placed on each line in the circumferential direction. Here, only some of the grip parts 35 are designated by reference numerals with the purpose of simplification of drawings.

An attached part 36, to which the dust seal 6 to be integrated with the lower case 3 is to be attached, is formed on an outer peripheral surface 332 of the flange 33.

Moreover, plural through holes 37 are formed in the flange 33 to pass through both the joining surface 34 formed in an upper surface 331 of the flange 33 and the lower surface 330 of the flange 33 and to be arranged in the circumferential direction of the center plate 4 (See FIG. 2(B)). Here, only some of the through holes 37 are designated by reference numerals with the purpose of simplification of drawings.

The center plate 4 is made of synthetic resin elastomer, such as polyolefin-based thermoplastic elastomer, polyamide-based thermoplastic elastomer, polyester-based thermoplastic elastomer, polystyrene-based thermoplastic elastomer, and polyurethane-based thermoplastic elastomer, which is impregnated with lubricant as necessary, including PTFE (Polytetrafluoroethylene), lubricating oil, and silicone; the center plate 4 is to be joined to the joining surface 34 formed the upper surface 331 of the flange 33 of the lower case 3, thereby being integrated with the lower case 3. Moreover, the center plate 4 is slidable on the sliding sheet 5 placed in the annular groove 27 of the upper case 2 and thus can support the load of the vehicle body to be applied to the suspension through the slide bearing 1 while allowing relative rotation between the upper case 2 and the lower case 3 (See FIG. 2).

FIG. 5(A) and FIG. 5(B) are respectively a plan view and a bottom view of the center plate 4, FIG. 5(C) is an F-F cross sectional view of the center plate 4 as illustrated in FIG. 5(A), and FIG. 5(D) is an enlarged view of the part G of the center plate 4 as illustrated in FIG. 5(C).

As illustrated in the figures, the center plate 4 is an annular member and has a bearing surface 40 slidable on the sliding sheet 5 placed in the annular groove 27 of the upper case 2; and a joining surface 41 located behind the bearing surface 40 so as to join to the joining surface 34 of the flange 33 of the lower case 3.

In the bearing surface 40, an annular groove 42 is formed in the circumferential direction of the center plate 4, holing the lubricant, such as lubricating grease.

The joining surface 41 includes recesses 45 as many as corresponds to the number of the grip parts 35 formed on the joining surface 34 (that is to be joined to the joining surface 41) of the flange 33 of the lower case 3; the recesses 45, each having a shape fitting the corresponding grip part 35, are formed at positions corresponding that of the respective grip parts 35, so that the grip parts 35 are to be inserted into the respective recesses 45 (See FIG. 2(A)). Here, only some of the recesses 45 are designated by reference numerals with the purpose of simplification of drawings.

The joining surface 41 has protrusions 43 as many as corresponds to the number of the through holes 37 formed through the flange 33 of the lower case 3; the protrusions 43, each having a shape fitting the corresponding through hole 37, are formed at positions corresponding those of the respective through holes 37, so that the through holes 37 are to be inserted into the respective protrusion 43 (See FIG. 2(B)). Here, only some of the protrusions 43 are designated by reference numerals with the purpose of simplification of drawings.

The sliding sheet 5 is a sliding member to be installed within the annular space 7 so as to be placed between the center plate 4 and the upper case 2, and is to be attached to the annular groove 27 of the upper case 2 so as to be slidable along the bearing surface 40 of the center plate 4.

The sliding sheet 5 is made of synthetic resin, such as fluorine resin, including PTFE or Modified PTFE obtained by copolymerization of TFE (tetrafluoroethylene) and a trace of other material (comonomers), polyacetal resin, polyethylene resin, polyamide resin, and polyphenylene sulfide resin; lubricant is added as necessary, such as PTFE (with proviso that the case of using PTFE or Modified PTFE as thermoplastic plastic is excluded), lubricating oil, silicone, and graphite, thereby enhancing sliding properties. In addition, reinforcement is added as necessary, such as aramid fibers, glass fibers, and carbon fibers, thereby enhancing strength. Alternatively, the sliding sheet 5 may be formed of metal excellent in sliding properties, such as brass alloy.

Figure 6:
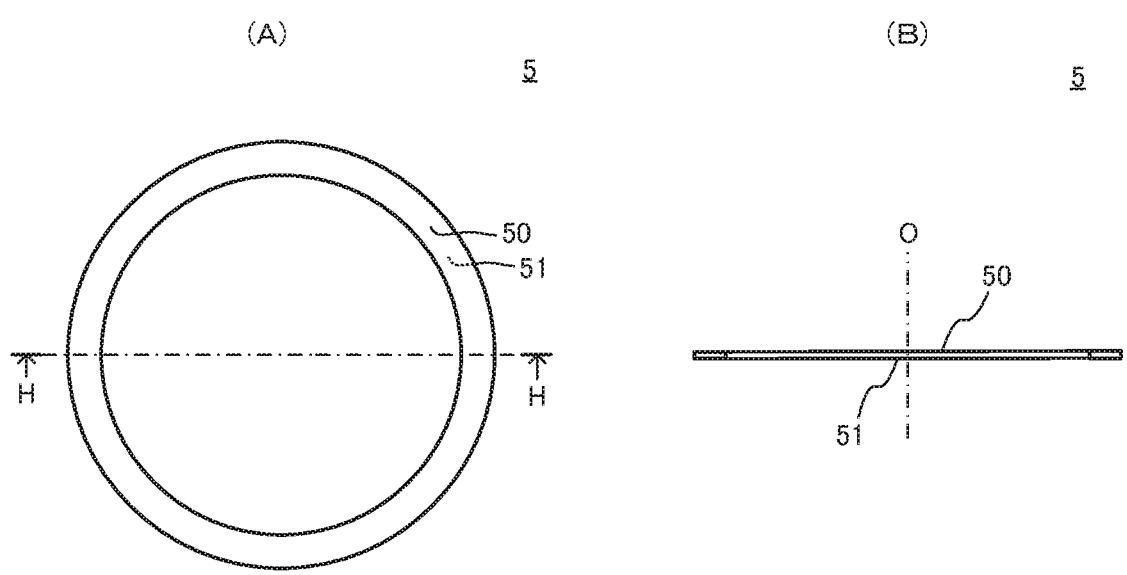
FIG. 6(A) is a plan view of a sliding sheet 5.
FIG. 6(B) is an H-H cross sectional view of the sliding sheet 5 as illustrated in FIG. 6(A).

FIG. 6(A) is a plan view of the sliding sheet 5, and FIG. 6(B) is an H-H cross sectional view of the sliding sheet 5 as illustrated in FIG. 6(A).

As illustrated in the figures, the sliding sheet 5 is an annular member with a substantially flat plate shape in cross-section along an axis O and includes a contact surface 50 to come into contact with a groove bottom inside the annular groove 27 of the upper case 2 and a sliding surface 51 located behind the contact surface 50 so as to come into slidable contact with the bearing surface 40 of the center plate 4. The sliding surface 51 of the sliding sheet 5 is in slidable contact with the bearing surface 40 of the center plate 4, thereby allowing for easy relative rotation between the upper case 2 and the lower case 3.

Figure 2:
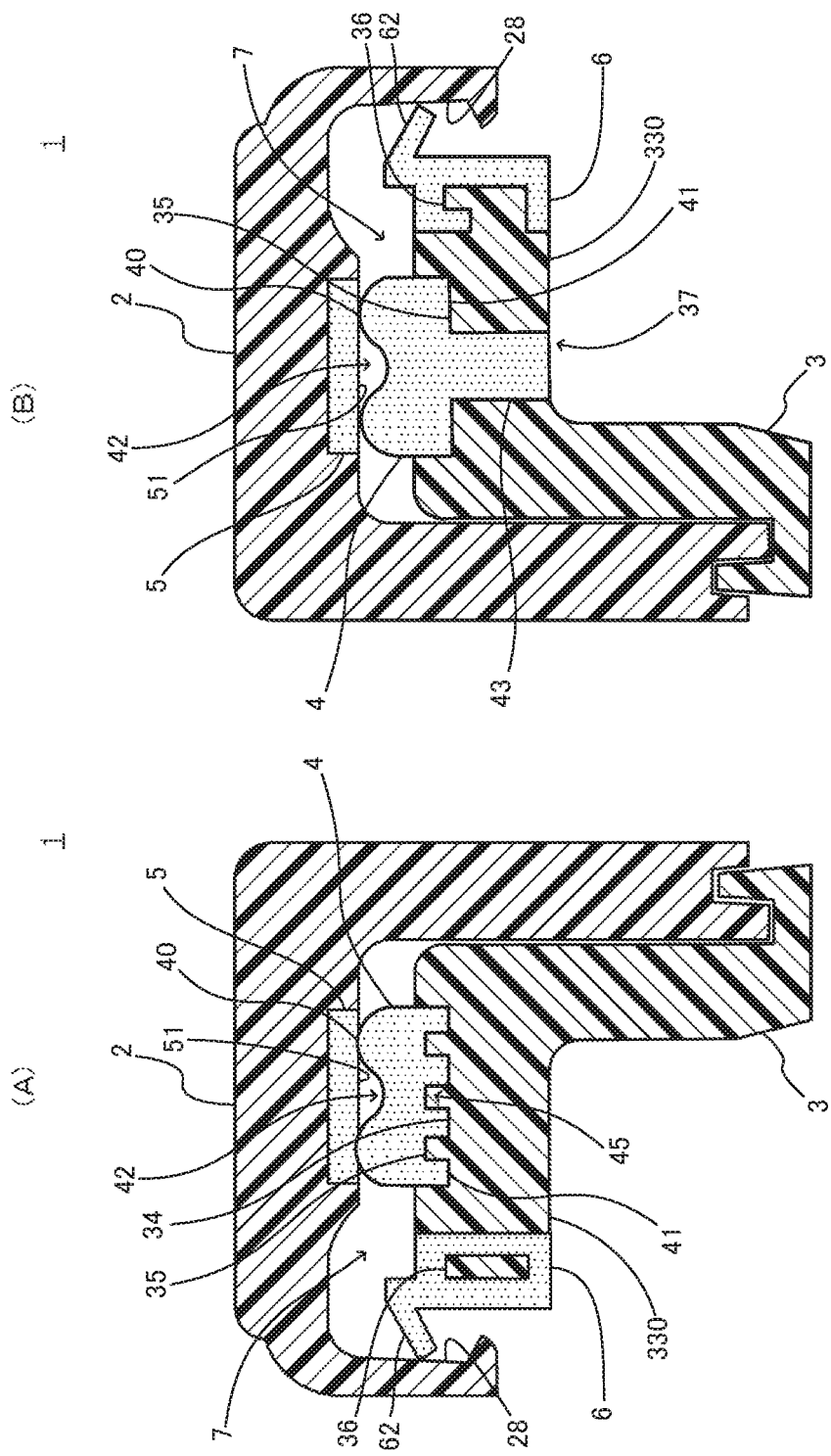
FIG. 2(A) is an enlarged view of the part B of the slide bearing 1 as illustrated in FIG. 1(D)
FIG. 2(B) is an enlarged view of the part C of the slide bearing 1 as illustrated in FIG. 1(D).

The dust seal 6 is integrated with the lower case 3 using same material as those of the center plate 4, for example; when being attached to the attached part 36 formed on the flange 33 of the lower case 3, the dust seal 6 seals a gap that is formed between the upper case 2 and the lower case 3 and leads to the annular space 7, as illustrated in FIG. 2.

Figure 7:
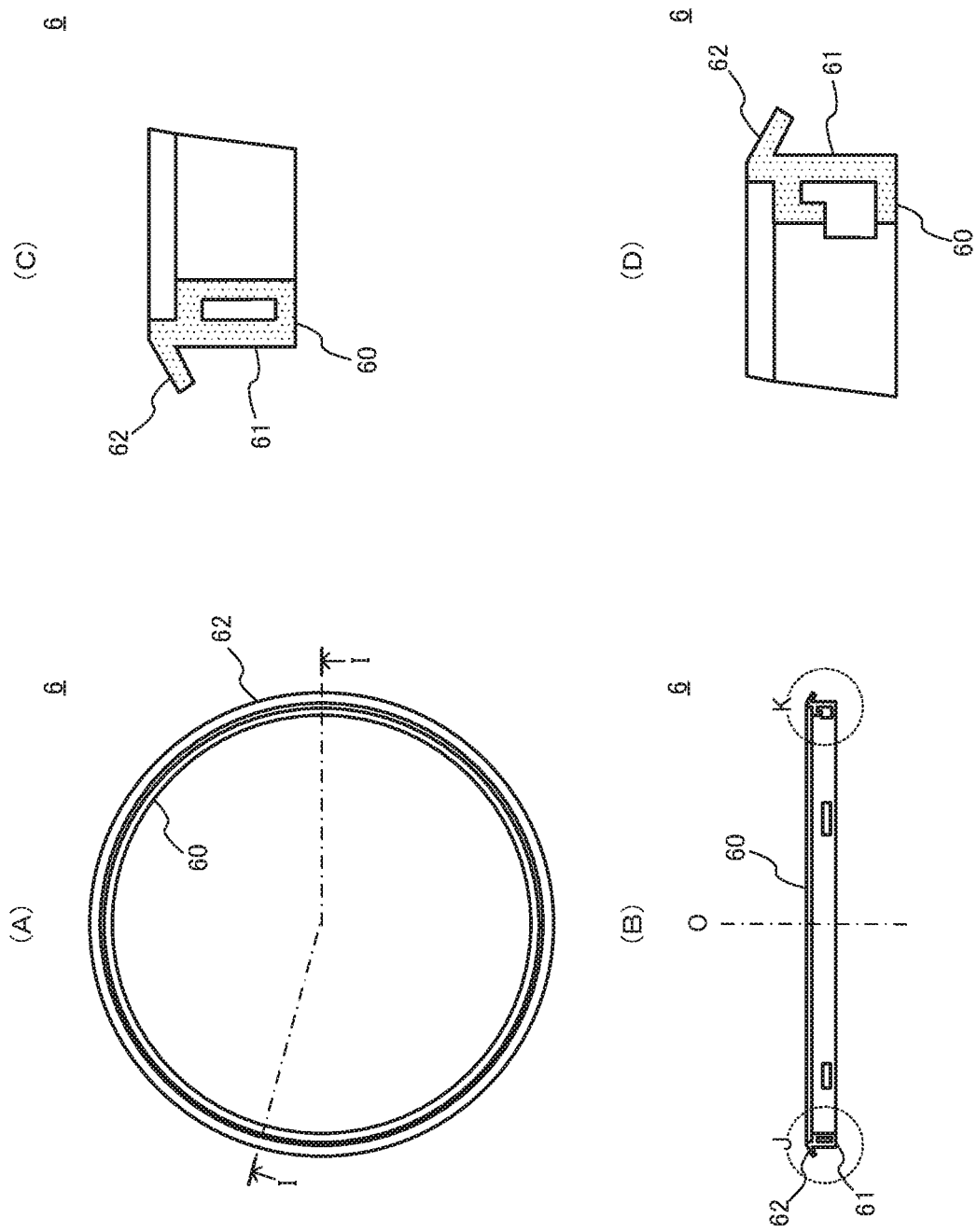
FIG. 7(A) is a plan view of a dust seal 6.
FIG. 7(B) is an I-I cross sectional view of the dust seal 6 as illustrated in FIG. 7(A)
FIG. 7(C) is an enlarged view of the part J of the dust seal 6 as illustrated in FIG. 7(B)
FIG. 7(D) is an enlarged view of the part K of the dust seal 6 as illustrated in FIG. 7(B).

FIG. 7(A) is a plan view of the dust seal 6, FIG. 7(B) is an I-I cross sectional view of the dust seal 6 as illustrated in FIG. 7(A), FIG. 7(C) is an enlarged view of the part J of the dust seal 6 as illustrated in FIG. 7(B), and FIG. 7(D) is an enlarged view of the part K of the dust seal 6 as illustrated in FIG. 7(B).

As illustrated in the figures, the dust seal 6 includes a dust seal body 60 in substantially cylindrical shape and a lip part 62 in annular shape; the dust seal body 60 has a shape fitting the attached part 36 formed on the flange 33 of the lower case 3 and is to be attached to the attached part 36, and the lip part 62 extends radially outward from an outer peripheral surface 61 of the dust seal body 60.

While the dust seal body 60 is attached to the attached part 36 formed on the flange 33 of the lower case 3, the lip part 62 is in contact with an outer peripheral side inner-wall 28 of the annular recess 25 of the upper case 2 (See FIG. 2). This results in sealing of the gap which is formed between the upper case 2 and the lower case 3 and leads to the annular space 7, thus preventing ingress of dust into this annular space 7.

Next, a manufacturing process for the slide bearing 1 according to the present embodiment will described.

Firstly, a manufacturing process for the lower case 3, the center plate 4 and the dust seal 6 will described.

Figure 8:
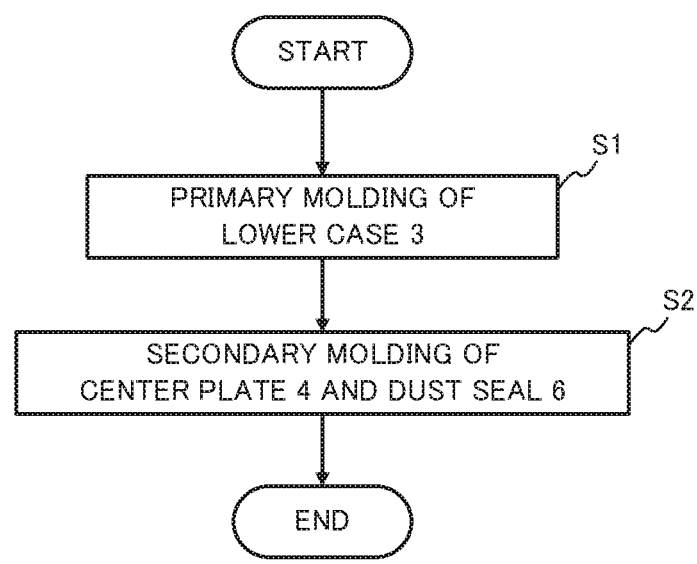
FIG. 8 is a flow diagram for explanation of a manufacturing process for the lower case 3, the center plate 4, and the dust seal 6.

FIG. 8 is a flow diagram for explanation of the manufacturing process for the lower case 3, the center plate 4, and the dust seal 6.

In the present embodiment, the lower case 3, the center plate 4, and the dust seal 6 are integrally formed through two-color injection mold process. First, the lower case 3 is formed through a primary molding (S1), and then the center plate 4 and the dust seal 6 are integrally formed with the lower case 3 through a secondary molding (S2). Here, the secondary molding (S2) may be preferably done after sufficient cooling of the lower case 3 completed through the primary molding leads to disappearance of dimensional change of the lower case 3 due to shrinkage of material.

The lower case 3 with which the center plate 4 and the dust seal 6 are integrally formed in such way as above, is combined with the upper case 2 so that the bearing surface 40 of the center plate 4 faces the sliding surface 51 of the sliding sheet 5 attached to the annular groove 27 of the upper case 2. This completes the assembly of the slide bearing 1.

Hereinabove, the embodiment according to the present invention has been described.

For the synthetic resin slide bearing 1 according to the present embodiment, the center plate 4 is formed integrally with the lower case 3 and this results in reduction of the number of component parts; and the grip parts 35 are formed on the joining surface 34 of the flange 33 of the lower case 3 so as to be inserted in and grasped by the recesses 45 formed in the joining surface 41 of the center plate 4. Here, the center plate 4 shrinks due to cooling after the secondary molding, whereas the lower case 3 with which the center plate 4 is to be integrally formed, has been already shrunk due to cooling after the primary molding thereby being stable in dimensions. Consequently, shrinkage of the center plate 4 causes the recesses 45 formed in the joining surface 41 of the center plate 4 to grasp tightly the respective grip parts 35 of the lower case 3. Additionally, these grip parts 35 allow for increased area of contact between the joining surface 41 of the center plate 4 and the joining surface 34 of the lower case 3. This enhances bonding strength between the center plate 4 and the lower case 3 and therefore prevents the center plate 4 from separating from the lower case 3, thus leading to the resultant yield enhancement. Consequently, according to the present embodiment, it is possible to reduce the number of component parts and to reduce costs because of the yield enhancement.

Additionally, in the present embodiment, the lower case 3 includes the through holes 37 each passing through both the joining surface 34 of the flange 33 and the lower surface 330, and the center plate 4 has the protrusions 43 to be placed in the respective through holes 37 of the lower case 3. This increases area of contact between the center plate 4 and the lower case 3, thus allowing for further enhancement of bonding strength between the center plate 4 and the lower case 3. Moreover, during the secondary molding for the center plate 4, a gate for pouring molten material into a mold is allowed to be located on an end 44 of each of the protrusions 43 of the center plate 4, and therefore no gate is require that would otherwise be located on the bearing surface 40 of the center plate 4. This causes the bearing surface 40 to be smooth and enhances sliding properties.

The present invention can include, but is not limited to, the above embodiments: it will be obvious to those skilled in the art that various changes may be made without departing from the scope of the invention.

In the above embodiments, any part can be available as the grip parts 35 formed on the joining surface 34 of the flange 33 of the lower case 3, as far as it has a shape holdable by the center plate 4, for example.

FIG. 9(A), FIG. 9(B), and FIG. 9(C) are respectively a plan view, a bottom view, and a front view, of the lower case 3A according to a modification of the lower case 3, and FIG. 9(D) is an L-L cross sectional view of the lower case 3A as illustrated in FIG. 9(A).

Figure 4:
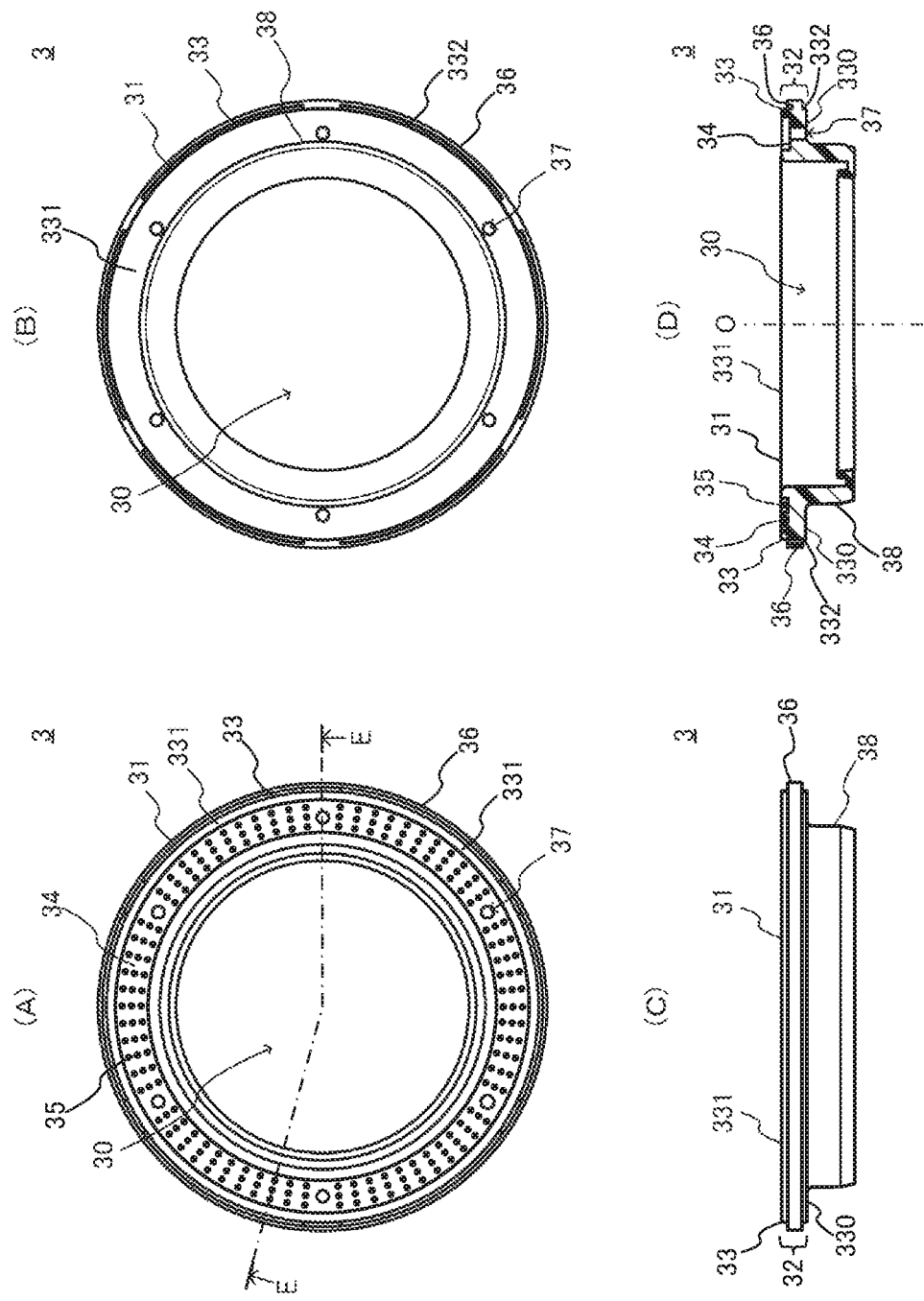
FIG. 4(A), FIG. 4(B), and FIG. 4(C) are respectively a plan view, a bottom view, and a front view, of a lower case 3.
FIG. 4(D) is an E-E cross sectional view of the lower case 3 as illustrated in FIG. 4(A).
Figure 9:
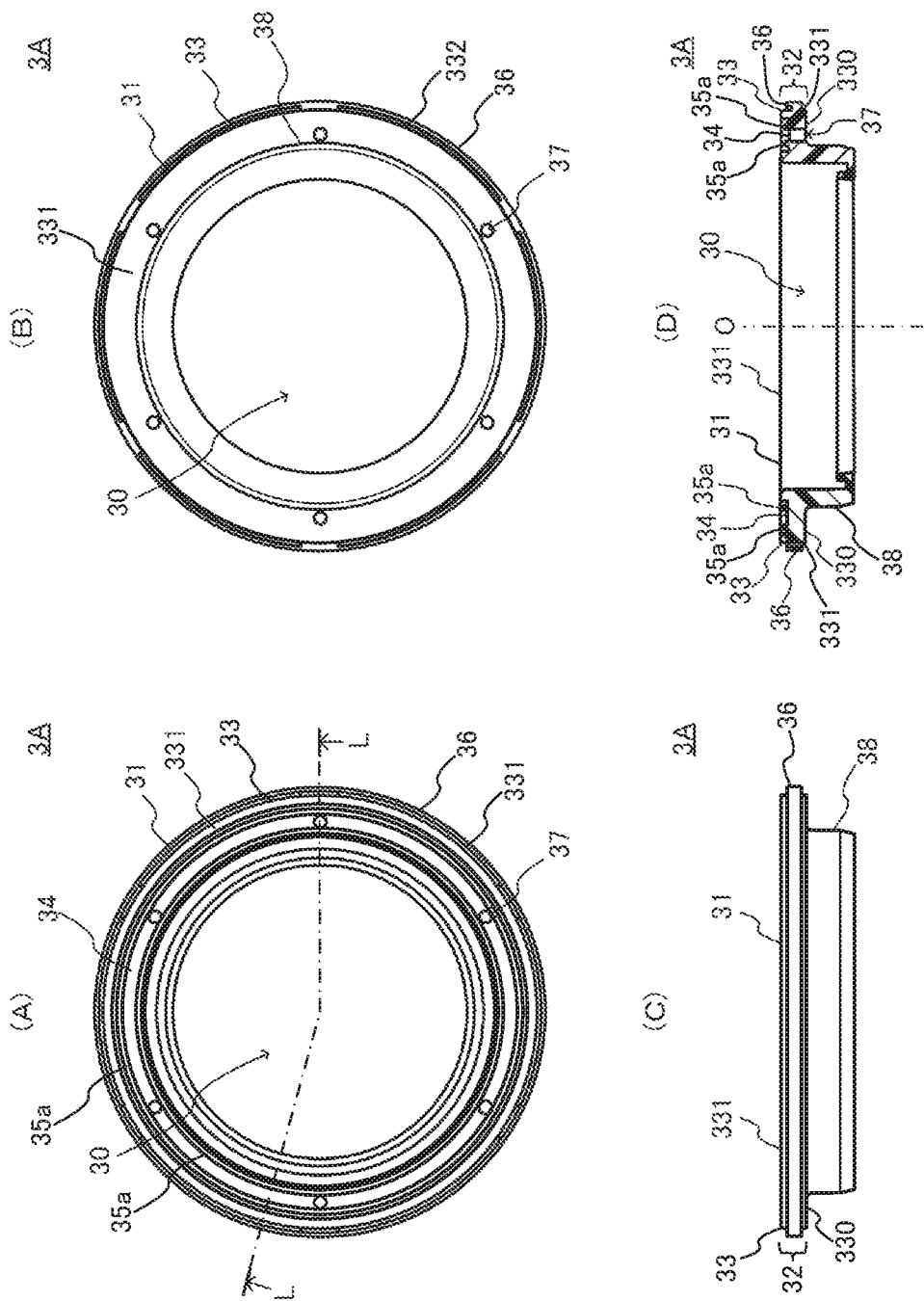
FIG. 9(A), FIG. 9(B), and FIG. 9(C) are respectively a plan view, a bottom view, and a front view, of a lower case 3A according to a modification of the lower case 3.
FIG. 9(D) is an L-L cross sectional view of the lower case 3A as illustrated in FIG. 9(A).

The lower case 3A as illustrated in FIG. 9 differs from the lower case 3 as illustrated in FIG. 4 in that the joining surface 34 of the lower case 3A has grip parts 35a instead of the grip parts 35. Other components are similar to those of the lower case 3 as illustrated in FIG. 4.

The grip parts 35a each have an annular convex shape about an axis aligned that of the center plate 4. Here, the two grip parts 35a are provided, but number of the grip part(s) 35a may be one, or may be three or more.

FIG. 10(A) and FIG. 10(B) are respectively a plan view and a bottom view of a center plate 4A according to a modification of the center plate 4, FIG. 10(C) is an M-M cross sectional view of the center plate 4A as illustrated in FIG. 10(A), and FIG. 10(D) is an enlarged view of the part N of the center plate 4A as illustrated in FIG. 10(C).

Figure 5:
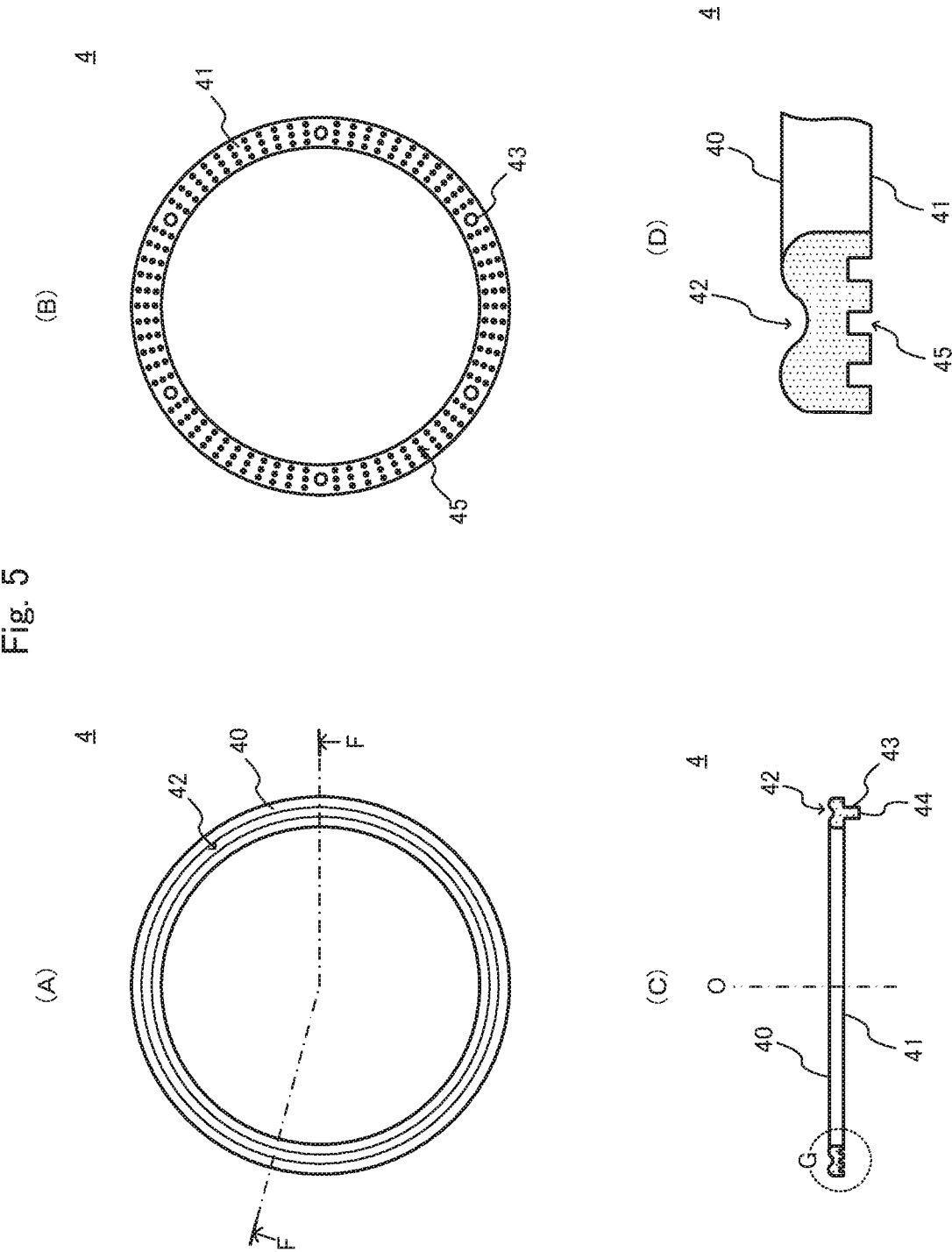
FIG. 5(A) and FIG. 5(B) are respectively a plan view and a bottom view of a center plate 4.
FIG. 5(C) is an F-F cross sectional view of the center plate 4 as illustrated in FIG. 5(A)
FIG. 5(D) is an enlarged view of the part G of the center plate 4 as illustrated in FIG. 5(C).

The center plate 4A as illustrated in FIG. 10 is an object to be integrally formed with the lower case 3A as illustrated in FIG. 9. This center plate 4A differs the center plate 4 as illustrated in FIG. 5 in that the joining surface 41 of the center plate 4A has recesses 45a instead of the recesses 45. Other components are similar to those of the center plate 4 as illustrated in FIG. 5.

The recesses 45a as many as corresponds to the number of the grip parts 35a of the lower case 3A as illustrated in FIG. 9, are formed at positions corresponding those of the respective grip parts 35a; each of the recesses 45a has an annular shape fitting the corresponding grip part 35a and is inserted into the corresponding grip part 35a.

Even in combination of the lower case 3A as illustrated in FIG. 9 and the center plate 4A as illustrated in FIG. 10, shrinkage of the center plate 4A after the secondary molding causes the recesses 45a formed in the joining surface 41 of the center plate 4A to grasp tightly the grip parts 35a of the lower case 3A. Moreover, these grip parts 35a increase an area of contact between the joining surface 41 of the center plate 4A and the joining surface 34 of the lower case 3A. This enhances bonding strength between the center plate 4A and the lower case 3A and therefore prevents the center plate 4A from separating from the lower case 3A, thus causing the resultant yield enhancement.

FIG. 11(A), FIG. 11(B), and FIG. 11(C) are respectively a plan view, a bottom view, and a front view, of a lower case 3B according to a modification of the lower case 3, and FIG. 11(D) is an O-O cross sectional view of the lower case 3B as illustrated in FIG. 11(A).

Figure 11:
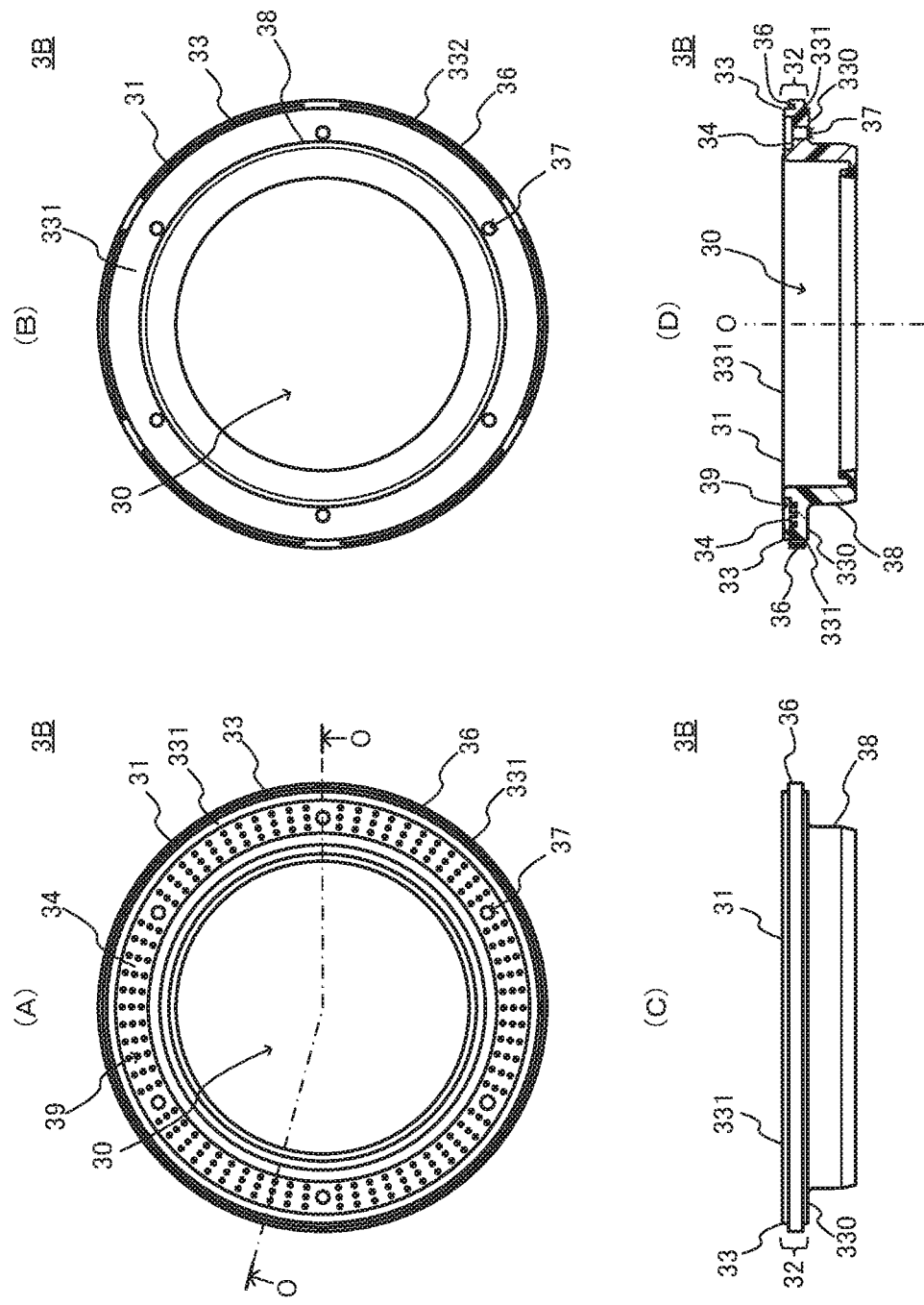
FIG. 11(A), FIG. 11(B), and FIG. 11(C) are respectively a plan view, a bottom view, and a front view, of a lower case 3B according to a modification of the lower case 3.
FIG. 11(D) is an O-O cross sectional view of the lower case 3B as illustrated in FIG. 11(A).

The lower case 3B as illustrated in FIG. 11 differs from the lower case 3 as illustrated in FIG. 4 in that the joining surface 34 of the lower case 3B has recesses 39 in cylindrical shape instead of the grip parts 35. Other components are similar to those of the lower case 3 as illustrated in FIG. 4.

The recesses 39 are formed on the joining surface 34 of the lower case 3 so that the plural are arranged each in the radial and circumferential directions of the center plate 4. Each of the recesses 39 has, but not limited to, a cylindrical shape: it may have a prismatic shape, such as triangular prism or square prism. Alternatively, each of the recesses 39 may have a hemispherical shape, or may have a pyramid shape, such as triangular pyramid. The recesses 39 may be formed so as to be arranged in such a pattern that at least one recess 39 is placed on each line in the radial direction and plural recesses 39 are placed on each line in the circumferential direction. Here, only some of the recesses 39 are designated by reference numerals with the purpose of simplification of drawings.

FIG. 12(A) and FIG. 12(B) are respectively a plan view and a bottom view of a center plate 4B according to a modification of the center plate 4, FIG. 12(C) is a P-P cross sectional view of the center plate 4B as illustrated in FIG. 12(A), and FIG. 12(D) is an enlarged view of the part Q of the center plate 4B as illustrated in FIG. 12(C).

Figure 12:
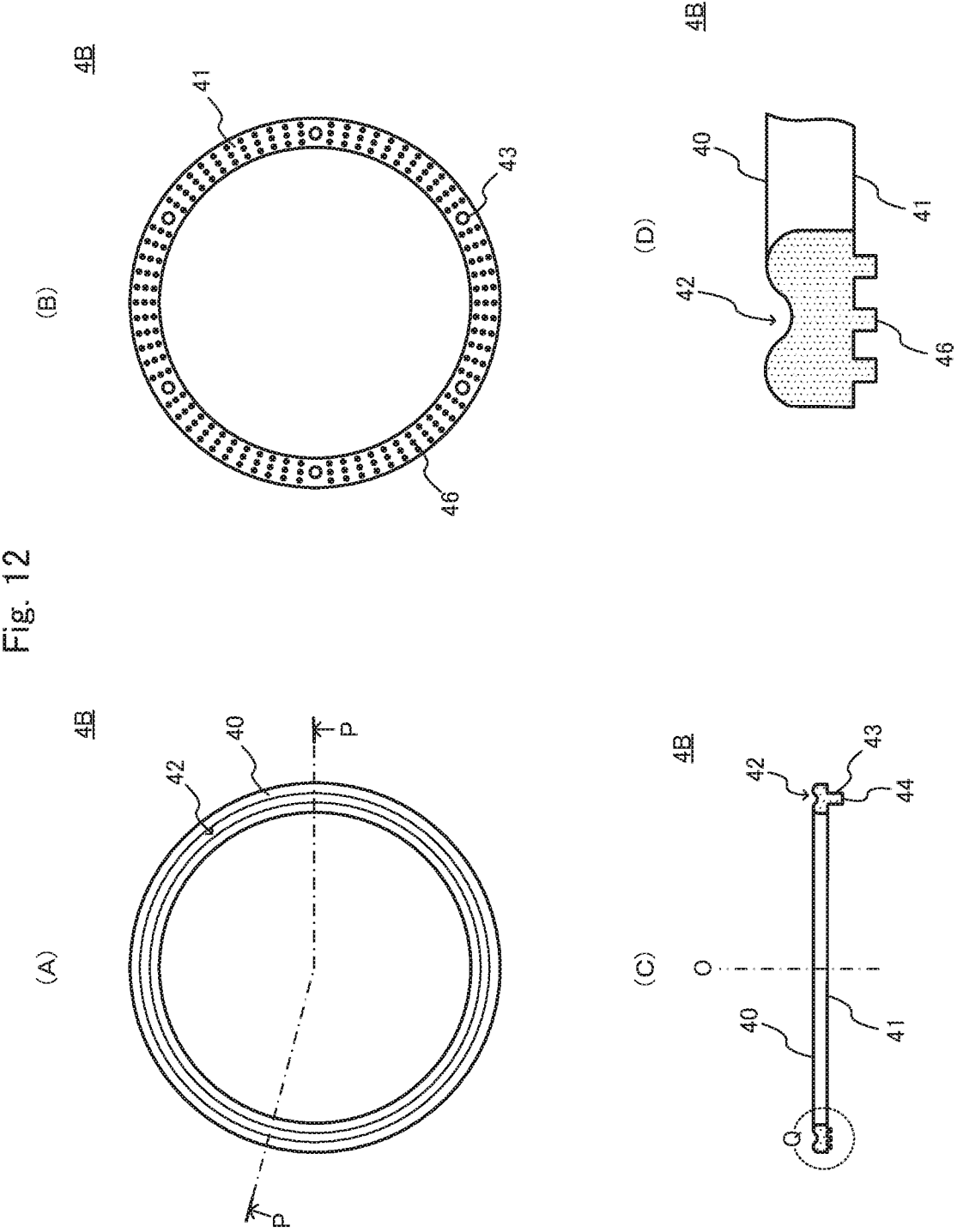
FIG. 12(A) and FIG. 12(B) are respectively a plan view and a bottom view of a center plate 4B according to a modification of the center plate 4.
FIG. 12(C) is a P-P cross sectional view of the center plate 4B as illustrated in FIG. 12(A)
FIG. 12(D) is an enlarged view of the part Q of the center plate 4B as illustrated in FIG. 12(C).

The center plate 4B as illustrated in FIG. 12 is an object to be integrally formed with the lower case 3B as illustrated in FIG. 11. The center plate 4B differs from the center plate 4 as illustrated in FIG. 5 in that the joining surface 41 of the center plate 4B has protrusions 46 instead of the recesses 45. Other components are similar to those of the center plate 4 as illustrated in FIG. 5.

The protrusions 46 as many as corresponds to the number of the recesses 39 of the lower case 3B as illustrated in FIG. 11, are formed at positions corresponding to the respective recesses 39; each of the protrusions 46 has a pillar convex shape fitting that of the corresponding recess 39 and is inserted into the corresponding recesses 39. Here, only some of the protrusions 46 are designated by reference numerals with the purpose of simplification of drawings.

For combination of the lower case 3B as illustrated in FIG. 11 and the center plate 4B as illustrated in FIG. 12, parts each placed between adjacent recesses 39 out of the plural recesses 39 formed in the joining surface 34 of the lower case 3B act as grip parts, and shrinkage of the center plate 4B after the secondary molding causes the protrusions 46 of the center plate 4B inserted in these recesses 39 to grasp tightly the grip parts of the lower case 3B. Moreover, the recesses 39 increase an area of contact between the joining surface 41 of the center plate 4B and the joining surface 34 of the lower case 3B. This enhances bonding strength between the center plate 4B and the lower case 3B and therefore prevents the center plate 4B from separating from the lower case 3B, thus causing the resultant yield enhancement.

FIG. 13(A), FIG. 13(B), and FIG. 13(C) are respectively a plan view, a bottom view, and a front view, of a lower case 3C according to a modification of the lower case 3, and FIG. 13(D) is an R-R cross sectional view of the lower case 3C as illustrated in FIG. 13(A).

Figure 13:
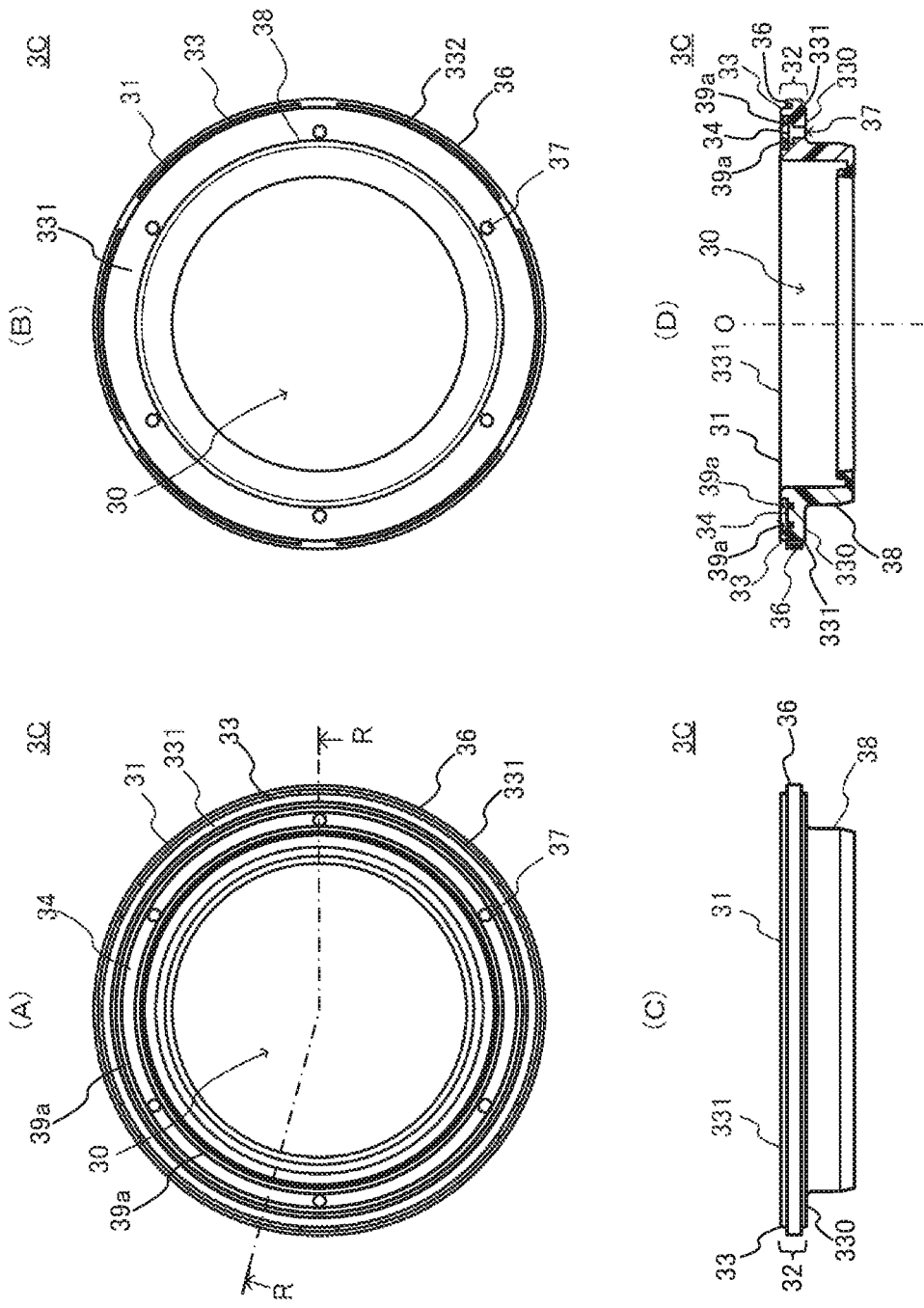
FIG. 13(A), FIG. 13(B), and FIG. 13(C) are respectively a plan view, a bottom view, and a front view, of a lower case 3C according to a modification of the lower case 3.
FIG. 13(D) is an R-R cross sectional view of the lower case 3C as illustrated in FIG. 13(A).

The lower case 3C as illustrated in FIG. 13 differs from the lower case 3 as illustrated in FIG. 4 in that the joining surface 34 of the lower case 3C includes recesses 39a instead of the grip parts 35. Other components are similar to those of the lower case 3 as illustrated in FIG. 4.

Each of the recesses 39a has an annular shape about an axis aligned to that of the center plate 4. The two recesses 39a are hereat provided, but number of the recesses 39a may be three or more.

FIG. 14(A) and FIG. 14(B) are respectively a plan view and a bottom view of a center plate 4C according to a modification of the center plate 4, FIG. 14(C) is an S-S cross sectional view of the center plate 4C as illustrated in FIG. 14(A), and FIG. 14(D) is an enlarged view of the part T of the center plate 4C as illustrated in FIG. 14(C).

The center plate 4C as illustrated in FIG. 14 is an object to be integrally formed with the lower case 3C as illustrated in FIG. 13. This center plate 4C differs from the center plate 4 as illustrated in FIG. 5 in that the joining surface 41 of the center plate 4C has protrusions 46a instead of the recesses 45. Other components are similar to those of the center plate 4 as illustrated in FIG. 5.

The protrusions 46a as many as corresponding number of the recesses 39a of the lower case 3C as illustrated in FIG. 13, are formed at positions corresponding to the respective recesses 39a, and each of the protrusions 46a has an annular shape fitting the corresponding recess 39a and is inserted into the corresponding recess 39a.

For combination of the lower case 3C as illustrated in FIG. 13 and the center plate 4C as illustrated in FIG. 14, parts each placed between adjacent recesses 39a out of the plural recesses 39a formed in the joining surface 34 of the lower case 3C act as grip parts, and shrinkage of the center plate 4C after the secondary molding causes the protrusions 46a of the center plate 4C inserted in these recesses 39a to grasp tightly the grip parts of the lower case 3C. Moreover, the recesses 39a increase an area of contact between the joining surface 41 of the center plate 4C and the joining surface 34 of the lower case 3C. This enhances bonding strength between the center plate 4C and the lower case 3C and therefore prevents the center plate 4C from separating from the lower case 3C, thus causing the resultant yield enhancement.

FIG. 15(A), FIG. 15(B), and FIG. 15(C) are respectively a plan view, a bottom view, and a front view, of a lower case 3D according to a modification of the lower case 3, and FIG. 15(D) is a U-U cross sectional view of the lower case 3D as illustrated in FIG. 15(A).

Figure 15:
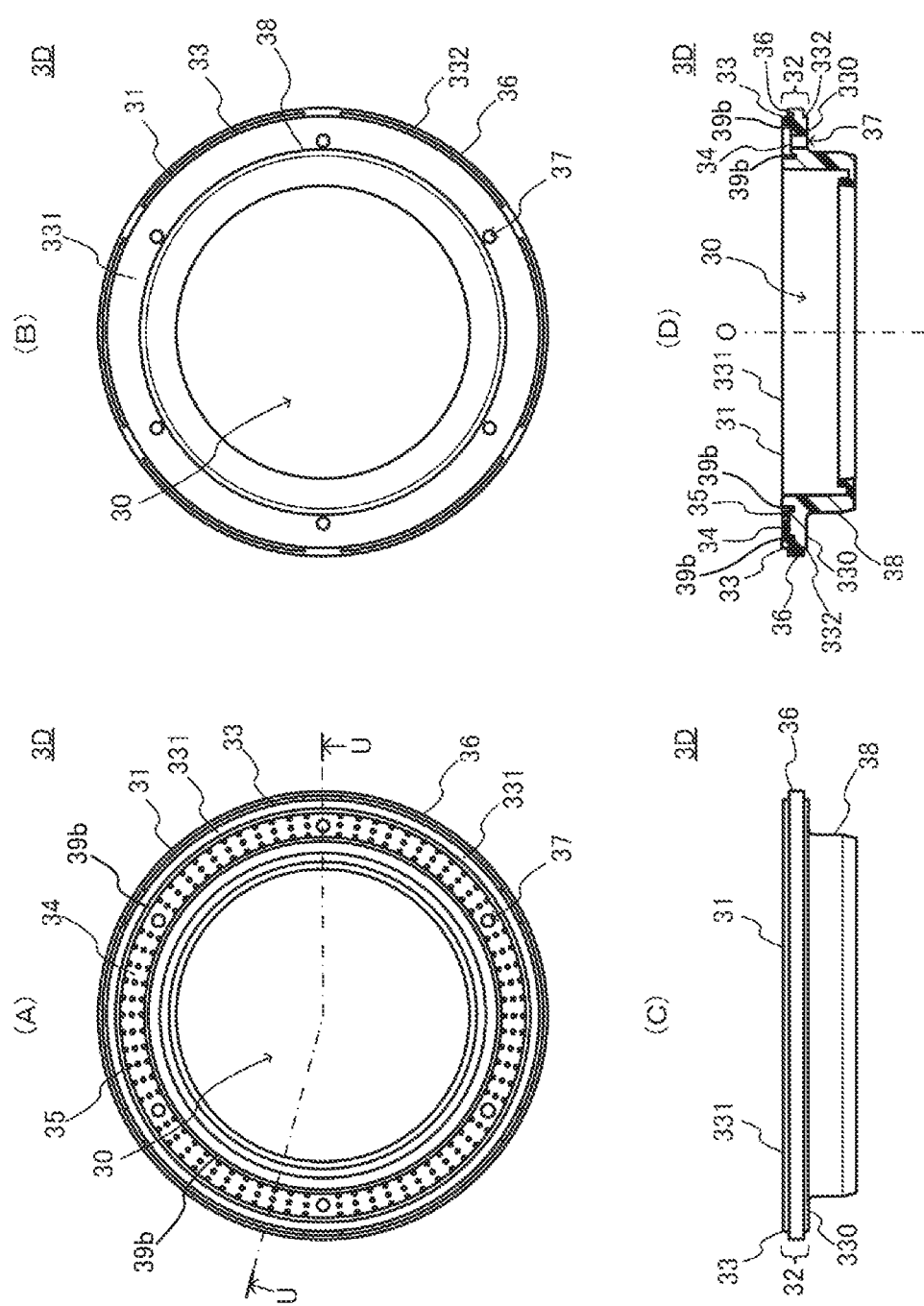
FIG. 15(A), FIG. 15(B), and FIG. 15(C) are respectively a plan view, a bottom view, and a front view, of a lower case 3D according to a modification of the lower case 3.
FIG. 15(D) is a U-U cross sectional view of the lower case 3D as illustrated in FIG. 15(A).

The lower case 3D as illustrated in FIG. 15 differs from the lower case 3 as illustrated in FIG. 4 in that the joining surface 34 of the lower case 3D includes not only the plurality of the grip parts 35 but also a pair of recesses 39b each having an annular shape about an axis aligned with that of the center plate 4. Other components are similar to those of the lower case 3 as illustrated in FIG. 4.

FIG. 16(A) and FIG. 16(B) are respectively a plan view and a bottom view, of a center plate 4D according to a modification of the center plate 4, FIG. 16(C) is a W-W cross sectional view of the center plate 4D as illustrated in FIG. 16(A), and FIG. 16(D) is an enlarged view of the part X of the center plate 4D as illustrated in FIG. 16(C).

Figure 16:
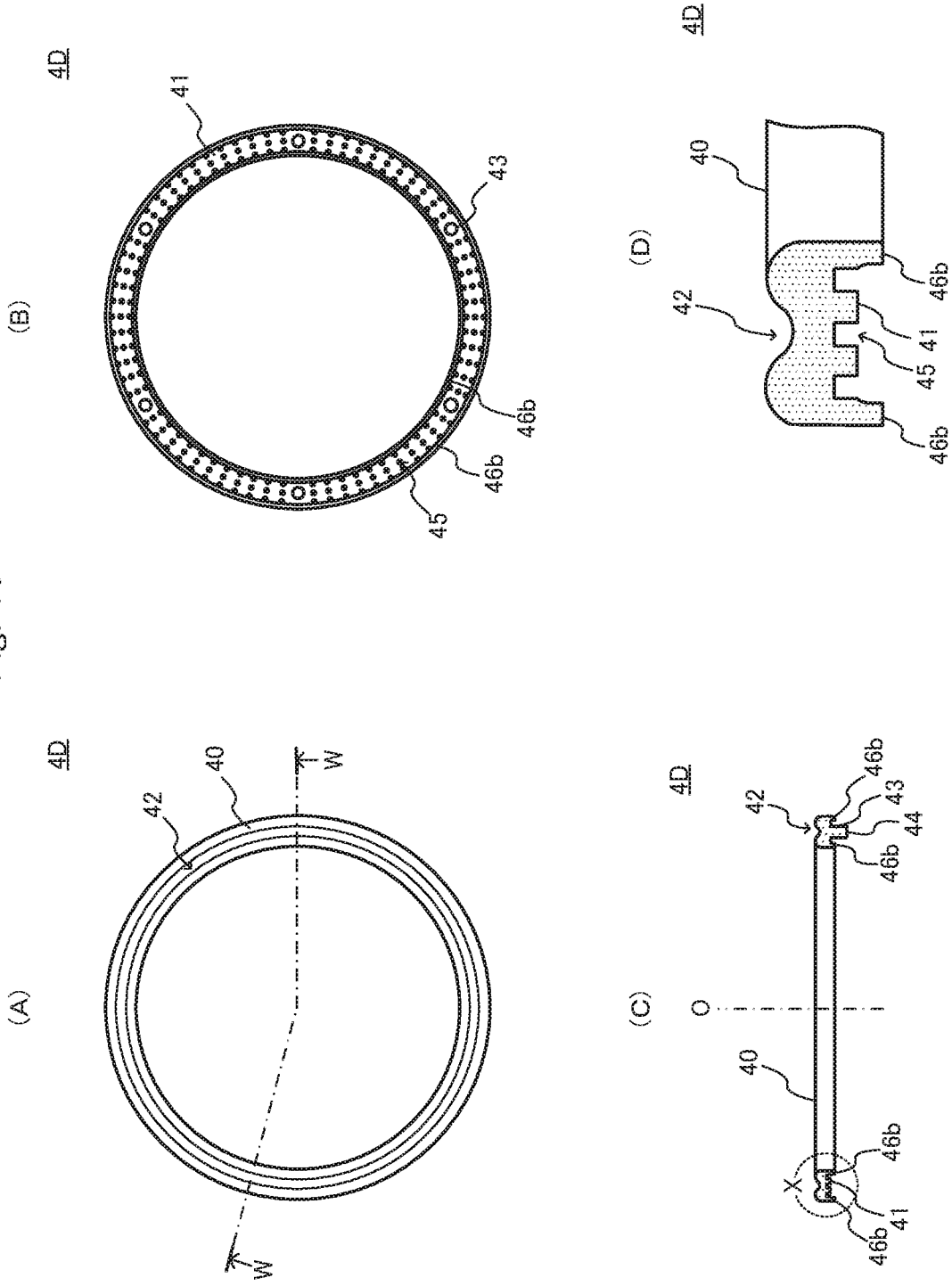
FIG. 16(A) and FIG. 16(B) are respectively a plan view and a bottom view of a center plate 4D according to a modification of the center plate 4.
FIG. 16(C) is a W-W cross sectional view of the center plate 4D as illustrated in FIG. 16(A)
FIG. 16(D) is an enlarged view of the part X of the center plate 4D as illustrated in FIG. 16(C).

The center plate 4D as illustrated in FIG. 16 is an object to be integrally formed with the lower case 3D as illustrated in FIG. 15. This center plate 4D differs from the center plate 4 as illustrated in FIG. 5 in that the joining surface 41 of the center plate 4D has not only the plurality of the recesses 45 but also a pair of protrusions 46b. Other components are similar to those of the center plate 4 as illustrated in FIG. 5.

Each of the paired protrusions 46b has an annular shape fitting the corresponding one of the paired recesses 39b of the lower case 3D as illustrated in FIG. 15 and is formed at a position corresponding to that of the corresponding one of the paired recesses 39b, so that the each protrusion 46b is to be inserted into the corresponding one of the paired recesses 39b.

For combination of the lower case 3D as illustrated in FIG. 15 and the center plate 4D as illustrated in FIG. 16, not only each of the recesses 45 formed in the joining surface 41 of the center plate 4D has a tight grasp on the corresponding grip part 35 of the lower case 3D, but also a part between the paired recesses 39b formed on the joining surface 34 of the lower case 3D acts as other grip part and shrinkage of the center plate 4D after the secondary molding causes the pair of the protrusions 46b of the center plate 4D inserted into the pair of the recesses 39b to grasp tightly the other grip part. Moreover, the recesses 39b increase an area of contact between the joining surface 41 of the center plate 4D and the joining surface 34 of the lower case 3D. This further enhances bonding strength between the center plate 4D and the lower case 3D and therefore prevents the center plate 4D from separating from the lower case 3D, thus causing the resultant yield enhancement.

Additionally, in the above embodiments, the center plate 4 and the dust seal 6 are, as separate objects from each other, molded integrally with the lower case 3; the scope of the present invention, however, is not limited in this respect. The center plate 4 and the dust seal 6 may be connected to each other by an arm so that the center plate 4 and the dust seal 6 are integrated. When doing this way, it is not necessary to arrange separate individual gates for the center plate 4 and the dust seal 6 in order to pour molten material into a mold during the secondary molding for the center plate 4 and the dust seal 6, and a structure of the mold is thereby further simplified, which leads to cost reduction.

In the above embodiments, the plural through holes 37 passing through both the joining surface 34 of the flange 33 and the lower surface 330 of the flange 33 are formed in the flange 33 of the lower case 3 so as to be arranged in the circumferential direction, and the plural protrusions 43 to be placed in the respective through holes 37 of the lower case 3 are formed on the joining surface 41 of the center plate 4 so as to be arranged in the circumferential direction. The scope of the present invention, however, is not limited in this respect. At least one through hole 37 may be formed in the flange 33 of the lower case 3, and correspondingly at least one protrusion 43 may be on the joining surface 41 of the center plate 4.

The above embodiments have been described taking the examples in which the center plate 4 is integrally formed with the lower case 3. The scope of the present invention, however, is not limited in this respect. The center plate 4 may be integrally formed with the upper case 2. In such case, the sliding sheet 5 may be attached to the lower case 3 and be slidable to the bearing surface of the center plate 4 integrally formed with the upper case 2.

In the above embodiments, the center plate 4 may be placed so as to slide the bearing surface over the case (the upper case 2 or the lower case 3) not integral with the center plate 4, thereby allowing for rotatable combination with either the upper case 2 or the lower case 3 without the sliding sheet 5.

The present invention is widely available for any slide bearing for supporting a load in various systems, including the suspension for vehicle.

REFERENCE SIGNS LIST

1: slide bearing; 2: upper case; 3, 3A, 3B, 3C, 3D: lower case; 4, 4A, 4B, 4C, 4D: center plate; 5: sliding sheet; 6: dust seal; 7: annular space; 10: holding hole; 20: insertion hole; 21: upper case body; 22: upper surface of the upper case body 21; 23: attachment surface of the upper case 2; 24: lower surface of the upper case body 21; 25: annular recess; 26: bottom surface inside the annular recess 25; 27: annular groove; 28: outer peripheral side inner-wall of the annular recess 25; 30: insertion hole; 31: lower case body; 32: upper end of the lower case body 31; 33: flange; 34: joining surface; 35, 35a: grip part; 36: attached part; 37: through hole; 38: outer peripheral surface of the lower case body 31; 39, 39a, 39b: recess; 40: bearing surface: 41: joining surface: 42: annular groove; 43: protrusion; 44: end of the protrusion 43; 45, 45a: recess; 46, 46a, 46b: protrusion; 50: contact surface; 51: sliding surface; 60: dust seal body; 61: outer peripheral surface of the dust seal body; 62: lip part: 330: lower surface of the flange 33; 331: upper surface of the flange 33; 332: outer peripheral surface of the flange 33

The invention claimed is:

1. A slide bearing for supporting a load, the slide bearing being made of synthetic resin and comprising:
    an upper case;
    a lower case combined with the upper case; and
    a center plate in an annular shape, the center plate being placed between the upper case and the lower case and allowing relative rotation between the upper case and the lower case,
    wherein the center plate is integrally formed with either the lower case or the upper case;
    a joining surface of either the lower case or the upper case has a grip part grasped by a joining surface of the center plate; and
    the grip part is a plurality of protrusions that are arranged in a circumferential direction and a radial direction, respectively.

2. A slide bearing according to claim 1, wherein each of the protrusions has a cylindrical shape.

3. A slide bearing according to claim 1, wherein each of the protrusions has a hemispherical shape.

4. A slide bearing according to claim 1, wherein each of the protrusions has a pyramidal shape.

5. A slide bearing according to claim 1 further comprising a dust seal sealing a gap between the upper case and the lower case.

6. A slide bearing according to claim 5, wherein the dust seal is integrally formed with the lower case or the upper case.

7. A slide bearing according to claim 1, further comprising a sliding sheet in substantially annular shape, the sliding sheet being placed between the center plate and the lower or upper case which is not integrated with the center plate.

8. A slide bearing according to claim 1, wherein
the slide bearing is configured to support the load to be applied to a shaft member while allowing rotation of the shaft member;
the upper case is configured to be attached to an object to be supported by the shaft member, with the shaft member inserted in the upper case;
the lower case is combined with the upper case and configured to hold the shaft member within; and
the center plate is placed between the upper case and the lower case so as to allow relative rotation between the upper case and the lower case, and configured to hold the shaft member within.

9. A method of manufacturing a slide bearing according to claim 1, comprising:
forming the center plate integrally with the lower or upper case by two-color injection molding in which the lower or upper case to be integrated with the center plate is completed in a primary cavity and the center plate is completed in a secondary cavity.

10. A slide bearing for supporting a load, the slide bearing being made of synthetic resin and comprising:
an upper case;
a lower case combined with the upper case; and
a center plate in an annular shape, the center plate being placed between the upper case and the lower case and allowing relative rotation between the upper case and the lower case,
wherein the center plate is integrally formed with either the lower case or the upper case,
wherein a joining surface of either the lower case or the upper case has a grip part grasped by a joining surface of the center plate, and
wherein the grip part includes at least one annular protrusion.

11. A slide bearing for supporting a load, the slide bearing being made of synthetic resin and comprising:
an upper case;
a lower case combined with the upper case; and
a center plate in an annular shape, the center plate being placed between the upper case and the lower case and allowing relative rotation between the upper case and the lower case,
wherein the center plate is integrally formed with either the lower case or the upper case,
wherein a joining surface of either the lower case or the upper case has a grip part grasped by a joining surface of the center plate, and
wherein the grip part is positioned between two annular recesses.

* * * * *